United States Patent
Pawlitzki

(10) Patent No.: US 9,689,980 B2
(45) Date of Patent: Jun. 27, 2017

(54) SECONDARY SURVEILLANCE RADAR SYSTEM FOR AIR TRAFFIC CONTROL

(75) Inventor: Alexander Pawlitzki, Backnang (DE)

(73) Assignee: Thales Deutschland GMBH (DE)

( * ) Notice: Subject to any disclaimer, the term of this patent is extended or adjusted under 35 U.S.C. 154(b) by 546 days.

(21) Appl. No.: 13/377,756

(22) PCT Filed: Jun. 10, 2010

(86) PCT No.: PCT/EP2010/058165
§ 371 (c)(1),
(2), (4) Date: Jan. 24, 2012

(87) PCT Pub. No.: WO2010/142768
PCT Pub. Date: Dec. 16, 2010

(65) Prior Publication Data
US 2012/0146833 A1    Jun. 14, 2012

(30) Foreign Application Priority Data
Jun. 12, 2009 (EP) .................... 09007741

(51) Int. Cl.
*G01S 13/00* (2006.01)
*G01S 13/78* (2006.01)
(Continued)

(52) U.S. Cl.
CPC ............ *G01S 13/781* (2013.01); *G01S 7/003* (2013.01); *G01S 13/878* (2013.01); *G01S 7/023* (2013.01); *G01S 13/24* (2013.01); *G01S 13/28* (2013.01)

(58) Field of Classification Search
CPC .... G01S 13/781; G01S 13/765; G01S 13/784; G01S 13/878; G01S 7/003
(Continued)

(56) References Cited

U.S. PATENT DOCUMENTS 4,027,307 A * 5/1977 Litchford ............ G01S 13/9303
342/32
4,910,526 A * 3/1990 Donnangelo ............. G01S 3/48
342/32
(Continued)

FOREIGN PATENT DOCUMENTS

EP  0 653 643 A  5/1995
GB  2 250 154 A  5/1992
(Continued)

OTHER PUBLICATIONS

Web Page, "Functional Principle of PTP", http://www.ieee1588.com/IEEE1588_Functional_Principle_of_PTP.html, copyright 2010.*
(Continued)

*Primary Examiner* — Frank J McGue
(74) *Attorney, Agent, or Firm* — Donald R. Boys; Central Coast Patent Agency, Inc.

(57) ABSTRACT

The invention refers to a secondary surveillance radar, referred to hereinafter as SSR, system (1) for air traffic control. The SSR-system (1) comprises a plurality of secondary radar stations (2) and is adapted for determining a location of an air traffic vehicle within the range of coverage of at least some of the secondary radar stations (2) by means of propagation time measurement of data signals (8) transmitted between the secondary radar stations (2) and a transponder (9) of the air traffic vehicle. Each of the secondary radar stations (2) works on a synchronized local time base. In order to provide for a high-precision synchronisation of the radar stations (2) of the SSR system (1) free of clusters, it is suggested that an SSR system's (1) secondary radar station (2) is synchronized depending on the content of synchronisation signals (10) received by the secondary radar station (2) to be synchronized and broadcast by one of the other secondary radar stations (2) of the SSR system (1).

(Continued)

Figure 1:
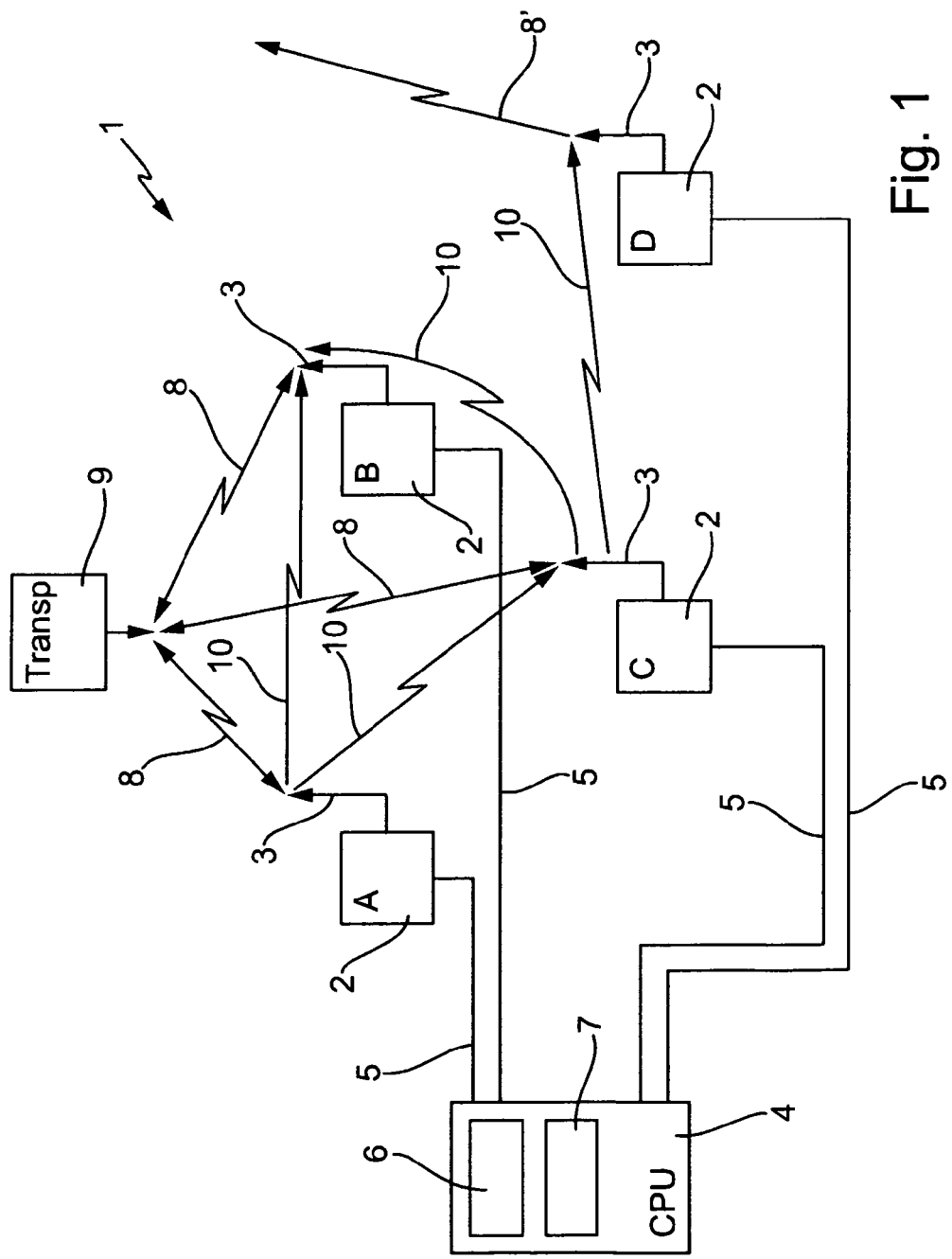

Preferably, the content comprises a time of transmission of the synchronisation signal (10).

15 Claims, 4 Drawing Sheets

(51) Int. Cl.
*G01S 7/00* (2006.01)
*G01S 13/87* (2006.01)
*G01S 13/28* (2006.01)
*G01S 13/24* (2006.01)
*G01S 7/02* (2006.01)

(58) Field of Classification Search
USPC .......................................................... 342/37
See application file for complete search history.

(56) References Cited

U.S. PATENT DOCUMENTS

| | | | | |
|---|---|---|---|---|
| 5,063,386 A * | 11/1991 | Bourdeau | ............. | G01S 13/784 342/37 |
| 5,363,109 A * | 11/1994 | Hofgen | ..................... | G01S 7/40 342/31 |
| 6,337,652 B1 * | 1/2002 | Shiomi | ................. | G01S 13/781 342/37 |
| 2004/0218633 A1* | 11/2004 | Burzynski | ..................... | 370/474 |
| 2007/0001903 A1 | 1/2007 | Smith et al. | | |
| 2007/0047591 A1* | 3/2007 | Senthilnathan et al. | ...... | 370/503 |
| 2007/0222666 A1* | 9/2007 | Coulmeau | ............... | G01S 7/003 342/32 |
| 2007/0247368 A1 | 10/2007 | Wu | | |
| 2008/0273521 A1* | 11/2008 | Shao et al. | ..................... | 370/350 |
| 2010/0080249 A1* | 4/2010 | Li et al. | ........................ | 370/503 |
| 2010/0117896 A1* | 5/2010 | Chu | ......................... | 342/357.07 |
| 2011/0279302 A1* | 11/2011 | Billaud | ................. | G01S 13/782 342/45 |

FOREIGN PATENT DOCUMENTS

GB 2250154 A * 5/1992
WO 2005111654 A 11/2005

OTHER PUBLICATIONS

Wikepedia Web Page, "Precision Time Protocol", http://en.wikipedia.org/w/index.php?title=Precision_Time_Protocol&oldid=406090044, Jan. 5, 2011 version.*

Neven W H L et al: "Wide Area Multilateration Report on EATMP TRS 131/04 Version 1.1", Internet Citation, [Online], Jan. 1, 2004, pp. 1-94, XP007907348, Retrieved from the Internet: URL:http://www.eurocontrol.int/surveillance/gallery/content/public/documents/WAM_study_report_1_1.pdf [retrieved on Feb. 24, 2009, p. 23-p. 34.

* cited by examiner

SECONDARY SURVEILLANCE RADAR SYSTEM FOR AIR TRAFFIC CONTROL

The present application claims priority to EP application 09007741.3, filed Jun. 12, 2009, which is incorporated herein in its entirety, at least by reference.

SPECIFICATION

The present invention refers to a secondary surveillance radar, referred to hereinafter as SSR, system for air traffic control. The SSR-system comprises a plurality of secondary radar stations and is adapted for determining a location of an air traffic vehicle within the range of coverage of at least some of the secondary radar stations. The location of the air traffic vehicle is determined by means of propagation time measurement of data signals transmitted between the secondary radar stations and a transponder of the air traffic vehicle. In order to enable an exact propagation time measurement, to allow a comparison of the propagation times measured by the secondary radar stations and to enable a reliable calculation of the air traffic vehicle's location by means of the so-called multilateration or hyperbolic positioning process, each of the secondary radar stations works on a synchronized local time base.

Principally, the propagation time measurement can be effected in two different ways: The air vehicle broadcasts a signal which is received by ground base stations which measure "time difference of arrival", or a real propagation time measurement of the transmitted signals is effected.

Secondary surveillance radar is referred to as "secondary", to distinguish it from the "primary radar" that works by passively bouncing a radio signal off the skin of an air traffic vehicle, e.g. an aircraft. Primary radar works best with large all-metal aircraft, but not so well on small, composite aircraft. Its range is also limited by terrain and meteorological conditions (e.g. rain or snow), and it also detects unwanted objects such as automobiles, hills and trees. Furthermore, not all primary radars can estimate the altitude of an aircraft. Secondary radar overcomes these limitations but it depends on a transponder in the aircraft to respond to dedicated interrogations from the secondary radar stations, for example ground stations, to make the aircraft more visible and to report the aircraft's altitude and other information relating to the aircraft.

A secondary surveillance radar (SSR) system is a radar system used in air traffic control (ATC) and also in airborne collision avoidance systems (ACAS). SSR systems not only detect and measure the position of an aircraft but also request additional information from the aircraft itself such as its identity and altitude. Unlike primary radar systems, which measure only the range and bearing of targets by detecting reflected radio signals, SSR relies on its targets being equipped with a radar transponder, which either transmits at certain points in time, for example regularly, a signal containing encoded data or replies to a dedicated interrogation signal by transmitting a response signal containing encoded data. The encoded data is used by the SSR system for locating the transponder's and the aircraft's position, respectively, by way of multilateration.

The secondary radar stations are base stations located at certain fixed positions on the ground. The position of the secondary radar stations is known to a central processing unit, to which the base stations are connected, and used for determining the transponder's and the aircraft's position. An SSR system using multilateration for detecting an aircraft's position and altitude depends on a precise synchronisation of the local time bases of all secondary radar stations of the SSR system. The currently used techniques for multilateration synchronisation are:

Synchronisation by an external clock (common clock mode), the external clock signal typically provided by a GPS (Global Positioning System) or GNSS (Global Navigation Satellite System) and received by GPS or GNSS receivers provided in the secondary radar stations.

One-way synchronisation by means of a separate, additional calibration transmitter, for example by means of a high frequency (HF) signal emitted by the transmitter. The secondary radar stations are located within the area of coverage of the calibration transmitter and can only receive calibration signals from the calibration transmitter, but cannot transmit signals to the calibration transmitter. All secondary radar stations synchronized by the same calibration transmitter form a so-called cluster. The interrelation between two clusters is formed in that one of the secondary radar stations receives calibration signals from two or more calibration transmitters and that the difference between the two or more cluster time bases is communicated to a central processing unit. In larger systems or WAM (Wide Area Multilateration) Systems, the desired coverage area may exceed the area covered by a single calibration transmitter; multiple clusters each with its own time base have to be established and they have to be bridged. The synchronisation messages which serve for the synchronisation of the stations of one cluster contain no useful information for timing. Synchronisation is performed merely depending on the time of arrival of the synchronisation messages, the content of the synchronisation messages is of no importance for the synchronisation.

GB 2 250 154 A and EP 0 653 643 A describe multilateration systems, the base stations of which have to be synchronized. The synchronisation sources used in these prior art references is an HF signal. The signal comprises an identifier (ID) of the base station transmitting the signal. The receiving base stations forward the ID together with information regarding the time of arrival (TOA) of the signal at the receiving base station to a central processing unit, to which the base stations are connected. The defined positions of the base stations are known at the central processing unit. The central processing unit determines an offset for the internal clocks of the various receiving base stations from the ID, the TOA and the positions of the base stations. Hence, the known synchronisation method needs a separate, additional central processing unit, to which all base stations have to be connected, for performing synchronisation of the base stations. Further, the HF signal used for synchronisation of the multilateration system is not used for the transmission of useful timing data.

It is, therefore, an object of the present invention to provide for an easy and simple high-precision synchronisation of radar stations of a WAM system free of clusters.

To solve this object the present inventions suggests an SSR system for air traffic control comprising the features of claim 1. In particular it is suggested that an SSR system's secondary radar station is synchronized depending on the content of synchronisation signals received by the secondary radar station to be synchronized and broadcast by one of the other secondary radar stations of the SSR system. Of course, more than one of the SSR system's secondary radar stations can be synchronized according to the present invention, in particular all of the SSR system's secondary radar stations.

According to the present invention, the use of time signal or time beacon transmitters as calibration devices is proposed. The time signal or time beacon transmitters are preferably but not necessarily at least one of the secondary radar stations of the SSR system. According to the preferred embodiment, the transmitters are not separate, additional hardware units. Rather, the hardware already present in known SSR systems is used for additionally performing the synchronisation of the secondary radar stations. Hence, these transmitters do not only transmit an arbitrary synchronisation signal, the signal also includes information in the data payload regarding and allowing the synchronisation of the secondary radar station(s) receiving the signal. The synchronisation signal preferably consists of data packets. It comprises in particular information indicative of the time of transmission of the synchronisation signal.

An important difference of the secondary surveillance radar (SSR) system according to the present invention and the conventional multilateration systems known from the prior art is the following: The conventional systems use synchronisation messages transmitted by their own or external transceivers. The data contained in those messages is used for identification of the source only, but does not contain any useful information which can be directly used for the synchronisation process itself. According to the present invention, information indicative of the time of transmission of the synchronisation signal is transmitted in the signal. This allows the receiving base stations to autonomously synchronize their local clocks. No separate additional central processing unit is necessary for synchronizing the base stations of the SSR system. According to the present invention, the additional data transmitted in the signal is embedded in the signal itself and can be directly used for the synchronisation without having to request further information from other external entities. The synchronisation of the secondary radar stations can be performed in each of the stations receiving the synchronisation signal. This means that according to the invention the synchronisation of the multilateration system does not require an additional external processing unit and data links connecting the base stations with the processing unit.

Consequently, the present invention allows a more flexible WAM/multilateration system design. In contrast thereto conventional systems known from the prior art are organized in cells or clusters and the interconnection between two WAM systems requires a complex protocol.

For a WAM system a complete synchronisation mesh can be established using redundant links to improve the overall synchronisation performance. Compared with the current synchronisation techniques, no additional data link is necessary for a receiver (secondary radar station) to get synchronized, since it can receive and deduce all relevant information necessary for its synchronisation from the content of the synchronisation signals received from one or more other secondary radar stations of the WAM system. All information necessary for the synchronisation is contained in the payload of the synchronisation data packets. Each of the secondary radar stations provides for its own synchronisation by receiving and processing the synchronisation information from one or more of the other radar stations. This technique can be used for synchronizing WAM systems of any size without having to introduce various clusters with different time bases. Instead, after synchronisation of all secondary radar stations the entire WAM system will run on a common synchronous time base. In order to simplify operations and processing this could be UTC (Universal Time Coordinated) or some derivative thereof, but of course it can also be any other (including a synthetic) time base.

Of course, it is possible that the secondary radar station to be synchronized receives synchronisation data packets not only from one but from a plurality of other radar stations. Then, the radar station to be synchronized can perform some kind of voting or mathematical processing in order to arrive at a single time base upon which the radar station to be synchronized then synchronizes its local time base. If the secondary radar station receives synchronisation signals from more than one of the other secondary radar stations the receiving secondary radar station may select one of the synchronisation signals which is transmitted by that other secondary radar station which is best synchronised. In that case the content of the synchronisation signals may comprise an identification of those secondary radar stations which the transmitting station is synchronized to and/or information on the quality of synchronisation of the transmitting station.

The information contained in the payload of the synchronisation signal and used for synchronisation of the radar stations comprises, for example, a point in time when the synchronisation signal is transmitted from the transmitting secondary radar station ("time of transmission"). The time of transmission is an unspecific signal (not directed to or provided for a certain receiving secondary radar station), which can be received and processed by any receiving station of the SSR system. The time of transmission cannot always be measured in advance (before the actual transmission has taken place and the signal has left the broadcast antenna) because the value for the time of transmission has to be inserted into the data payload before the signal is actually transmitted, that is before the exact time of transmission is known. In this case, the synchronisation signal may comprise two consecutive data packets or telegrams. The second of the two data packets contains the time of transmission of the first packet.

In so-called coherent systems the time of transmission can be determined in advance. In that case a single data packet would be enough. However, the idea of the present invention to broadcast the time of transmission in a data packet to be received by receiving stations to be synchronized is the same.

Apart from the time of transmission the synchronisation signals may also contain status data from the time beacon transmitters, which give various health information, which can be used to generate a real time idea of the status of the various secondary radar stations in the entire network. The concept of time beacon transmitters allows the use of time beacons even outside the multilateration system without the need of having an additional data link to them. From an architectural point of view, for the first time ever the synchronisation function is performed in the ground station itself using time beacons.

The information contained in the synchronisation signal transmitted by the transmitting station preferably is a time information in the transmitter's time domain. The transmitted signal is an unspecific signal which is not intended for a certain receiver and which, therefore, can be received by any receiving station within reach of the transmitted signals. At the receiver the time information received from the transmitting station can be used for determining a predicted time of arrival of the synchronisation signals in the transmitter's time domain. Together with additional information like the actual time of arrival in the receiver's time domain can be used for determining a difference between the transmitter's time domain and the receiver's time domain and, finally, for synchronizing the receiver on the transmitter's time domain.

The transmitted time information transmitted as payload content of the synchronisation signal is preferably the time of transmission. Together with additional information like the distance of the transmitting to the receiving station and the propagation time for signals in general can be used to determine the predicted time of arrival in the transmitter's time domain.

Of course, it would also be possible to determine the clock correction value at the receiving station by comparing the time of transmission in the broadcasting station's time domain contained in the received synchronisation signal with an estimated time of transmission determined from the actual time of receipt of the synchronisation signal at the receiving station in the receiving station's time domain taking into consideration the synchronisation signal's propagation time.

By means of the described one way synchronisation a radar station can be synchronized to a common time base, for example to the time base of at least one other secondary radar station of the SSR system. The one way synchronisation allows an easy, fast, and reliable synchronisation of the secondary radar stations of the SSR systems. Additionally, a two way synchronisation can be used in order to enhance the performance and accuracy of the multilateration process, that is the determination of an aircraft's location. Generally, the geometric distance between the calibration nodes (corresponding to the radar stations) is known because stationary transmitters (corresponding to the radar stations transmitting the synchronisation data packets) are located at fixed known positions. The two way technique can be used to check whether there are additional unknown effects in the transmission path (mountains, buildings, trees, meteorological disturbances, etc.), which may effect the propagation time of the synchronisation data packets from the at least one of the other radar stations to the radar station to be synchronized. Assuming that the distances between the base stations is fixed, the two way synchronisation allows a real time performance test of the entire SSR system by comparing the results of the one way synchronisation with those of the two way synchronisation. In that case the estimated propagation time and hence the aircraft's location can be determined with a higher accuracy, in particular by taking into account certain effects in the transmission path effecting the actual propagation time of the response signals. Further, the the two way synchronisation also allows a more precise synchronisation of the secondary radar stations receiving the synchronisation signals. Furthermore, the two way technique allows an evaluation of the transmission path the response signals on their way from an aircraft's transponder to the receiving radar stations and the synchronisation signals on their way from the transmitting radar station to the radar station to be synchronized travel. This is particularly advantageous if the station is a mobile secondary radar station recently located wherever needed and if the position of that station has not yet been determined and/or communicated to the other radar stations.

For realizing the two way synchronisation, the station to be synchronized also broadcasts data signals. These data signals are received by the SSR system's stations which broadcast the synchronisation signals. Hence, the transmitting station broadcasts synchronisation signals and receives data signals from other secondary radar stations in reach. The received data signals can be used for determining those stations from which data signals can be received, that is those stations in reach, and the quality of the data signals received from these stations.

The data signals transmitted by the other stations can be received by the station which transmits the synchronisation signal and by one or more of the other stations, too. The stations receiving the data signals, among them the station transmitting the synchronisation signals, may enter the information into a list, which is updated from time to time. The list may be updated regularly or at the occurrence of certain events, for example, if signals are received from new stations, if the quality of the received signals changes or if no signals are received any more from a certain station. The list may also contain time stamps assigned to the various stations contained in the list and representing the time when the quality of the data signal received from a certain station was determined.

The information contained in the list may be broadcast to the other stations of the SSR system, preferably as part of the payload of the synchronisation signal. Due to the restricted bandwidth when transmitting data across the air interface among the secondary radar stations, the information is preferably transmitted consecutively for one of the stations contained in the list after the other, wherein each of the synchronisation signals preferably contains the information of one of the stations contained in the list. If each synchronisation signal transmitted by the secondary radar station contains the information regarding the transmission path to exactly one other station of the list, after having transmitted a number of synchronisation signals corresponding to the overall number of stations in reach of the station transmitting the synchronisation signal, all information contained in the list has been transmitted.

The additional information regarding the transmission path from the broadcasting station to one of the secondary radar stations to be synchronized is received and extracted from the payload by the all the other stations in reach. However, the additional information regarding the transmission path is processed only by that receiving station which it refers to. For example, if a receiving station notices that the additional information refers to the transmission path of the broadcasting station to another station, the receiving station only uses the time of transmission contained therein for the synchronisation of its local clock and disregards the information regarding the transmission path. In contrast, if a receiving station notices that the additional information refers to the transmission path of the broadcasting station to the receiving station, it uses the time of transmission contained therein for the synchronisation of its local clock and uses the information regarding the transmission path for updating the propagation time value in order to obtain a higher accuracy for future synchronisations.

Due to the fact that the stations' positions and the characteristics of the transmission paths change only in exceptional cases and if they do change they change with very long time constants and due to the fact that the stations are equipped with crystal oscillators, the additional information regarding the transmission path contained in the list at the broadcasting station has to be updated and transmitted to the other stations not very often. An update and transmission rate in the range of once every one or more minutes, preferably once or twice a minute, will offer good results.

For example, if a secondary radar station has ten other SSR system's stations in reach and if the additional information regarding the transmission path is broadcast across an air interface, synchronisation signals may be transmitted regularly twice each second, that is 120 times each minute.

If the synchronisation signals comprised additional information regarding the transmission path to only one of the stations in reach, ten synchronisation signals would have to comprise the additional information for a certain station. If the information regarding the transmission path was updated once a minute, only ten of the 120 synchronisation signals transmitted per minute would have to contain the additional information regarding the transmission path. The receiving station to be synchronised will be able to synchronize its local time domain 120 times each minute and to update the information regarding the propagation time for signals transmitted from the broadcasting station to the receiving station once a minute. The synchronisation signals containing the additional information regarding the transmission path could be sent consecutively so the remaining 110 synchronisation signals to be transmitted that minute would comprise no additional information regarding the transmission path. Alternatively, the synchronisation signals comprising the additional information regarding the transmission path could be distributed so, for example, each twelfth synchronisation signal would comprise additional information regarding the transmission path from the broadcasting station to one of the other stations in reach.

Of course, the additional information contained in the synchronisation signals may be transmitted across any transmission path between the broadcasting secondary radar station and the secondary radar stations to be synchronized, for example across a separate transmission line or a separate network established between the SSR system's secondary radar stations. In that case a higher bandwidth is available and it would be possible to transmit all information contained in the list at the secondary radar station transmitting the synchronisation signal to be synchronized at once.

According to a preferred embodiment of the present invention it is suggested that the synchronisation signals or rather the synchronisation data packets (sync packets) are transmitted across the air interface also used for transmitting interrogation signals to transponders of aircraft and for receiving response signals from the aircrafts' transponders. The same applies to the data packets transmitted in the two way technique from the secondary radar station to be synchronized to the one or more other secondary radar stations of the SSR system. Sync and data packets, too, can be transmitted across the air interface also used for transmitting signals between the ground stations and the aircrafts. This communication between the ground stations and the aircrafts can use a Mode S (uplink: 1030 MHz, downlink: 1090 MHz), a UAT (Universal Access Transceiver; uplink and downlink: e.g. using 978 MHz), a VHF Data Link (VDL) Mode 4 (utilizing one or more of the existing aeronautical VHF frequencies) or variants thereof on other frequencies. All RF signals can be used to carry synchronisation information. For the air traffic control systems this means that every RF signal link—regardless of which primary purpose—can be used to synchronize a multilateration system. The aim of the invention is to minimize the use of additional RF signals and to use the already existing signals in a hybrid way. The means for data modulation into these signals could be either the use of already existing data fields or the use of additional modulation or coding schemes which are invisible and transparent to the legacy equipment already using these signals.

According to this embodiment the transmission of the synchronisation data packets from at least one of the secondary radar stations to the secondary radar station to be synchronized and the transmission of the data packets in the opposite direction is performed of the RF link, so that the two way calculation can be performed purely based on airside data.

Since all stations are equipped with quite precise crystal oscillators, the transmission rate for the synchronisation status packets can be as low as once or twice per minute. This transmission rate is high enough to ensure a desired precision of the synchronisation of the stations' local clocks in the range of only a few nanoseconds. The "Level Status" generated from the status packets can be constant for a certain period of time, and, therefore, does not necessarily have to be transmitted more often.

The various secondary radar stations of the SSR system treat the synchronisation signal itself as a data link which contains all relevant information for the synchronisation. An important aspect of the invention is the hybrid usage of the synchronisation signal as means of wireless data link on the one hand and carrying all relevant data for the synchronisation process on the other hand and not only serving as a source for identification of the sender.

The fact that the synchronisation signal carries data can also be used to transmit more information than the pure synchronisation relevant data. For the implementation in areas with a low traffic volume, this additional information can even comprise measurement results from remote sensors, making an additional data link—which could be very expensive—not necessary. The additional information can be transmitted either on the same frequency and modulation scheme as the primary used synchronisation signal or on other frequencies. Since most hardware of today is frequency agile, a transmission on a neighbour channel could be an option; this can be done with the already installed hardware, cabling and/or antenna. One example would be to use the 1090/1030 capable time beacon transmitter to transmit the additional data either on 1030/1090 MHz or in any frequency band in between, for example with a narrow band modulation scheme like UAT or similar.

The proposed architecture of time beacon transmitters allows a precise synchronisation of a multitude of multilateration sensor receivers. In the same way, the time signals emitted by the system's time beacon transmitters can also be used by a mobile or airborne participant to perform localisation on its own. With other words, the architecture for synchronisation of the secondary radar stations of the SSR system is also used for navigational purposes. This provides—at least locally—a navigation system completely independent from conventional navigation systems, like for instance GPS, Galileo, or similar navigation systems, which allows users to perform RAIM (Receiver Autonomous Integrity Monitoring) measurements (real-time check whether the receiver operate properly within given time tolerances).

Upon reception of signals from four time beacon stations, the mobile unit can resolve its position/time equation (4 unknowns). If it receives signals from less time beacon stations, it can resolve its positioning equation at least partially or—by using additional incomplete means of position determination like DME (Distance Measurement Equipment)—completely.

According to a preferred embodiment of the invention, a number of time beacon transmitters operate in the aeronautics SSR radar frequency band (1030/1090 MHz). However, the time beacon transmitters can also use other frequencies and modulation schemes in the DME band (960 to 1215 MHz) or other radio navigation bands like ILS (Instrument Landing System)/VOR (VHF Omnidirectional Radio Range) between 110 and 118 MHz. The participants (i.e. the airborne receivers) will then use the information contained in these signals for localisation purposes. The new aspect here is that there are now two systems for multilateration making use of the time beacons: One is the "classical" system with sensors on the ground, the other is an airborne system, where these signals are used as addition for navigation and complement NAVAIDS (Navigational Aid: navigation system using time and ranging) delivering only incomplete solutions like DME to a full two-dimensional/three-dimensional navigation system.

The time beacon can transmit the timing information in various ways. As described in detail later on, in non-coherent systems, the timing information can be divided up into a challenge/follow-up pair. This means that the packets are transmitted in doublets, the first containing a system ID and status information. In coherent systems, the time of transmission is known in advance, so a doublet is no longer necessary and the data packet still carries the exact time of transmission. The information can also be transmitted via a so-called piggy-back modulation, for example spread spectrum coded signals overlaying other signals of different use.

So not only multilateration systems but also VOR, ILS or DME transmitters can be equipped with auxiliary transmitters or modulators to transmit timely accurate and highly precise time beacons.

Currently, in the prior art a well-known synchronisation source for multilateration systems is GPS. With the present invention also other time sources can be used to synchronize multilateration systems, like VLF based signals, LORAN (Long Range Navigation) etc. When the multilateration time beacons (or the other beacons) use these alternative time inputs, a ground based time broadcast system independent from GPS or other space based GNSS can be established, allowing airborne participants to use this alternative source of time for their independent localisation.

Figure 2:
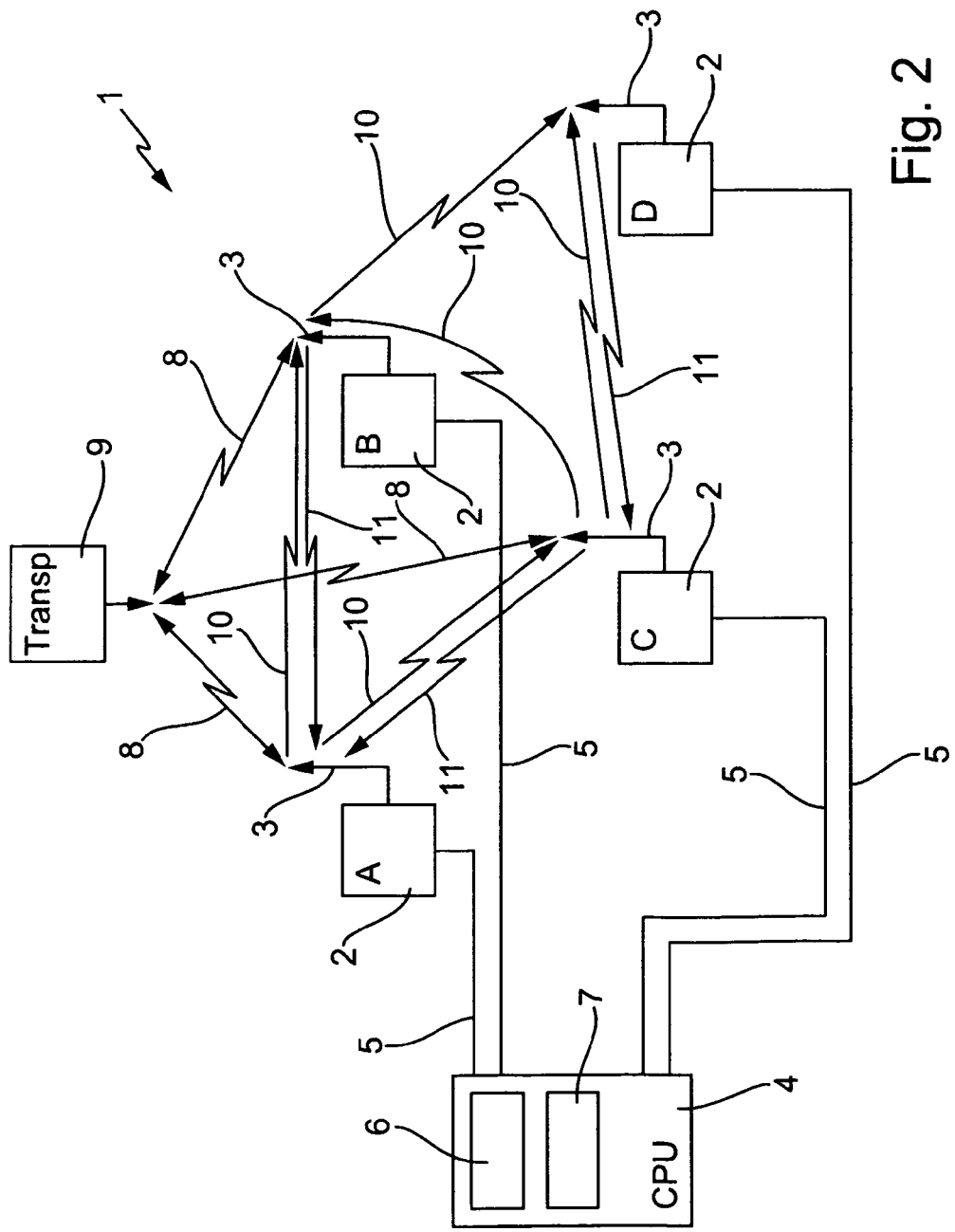
Figure 3:
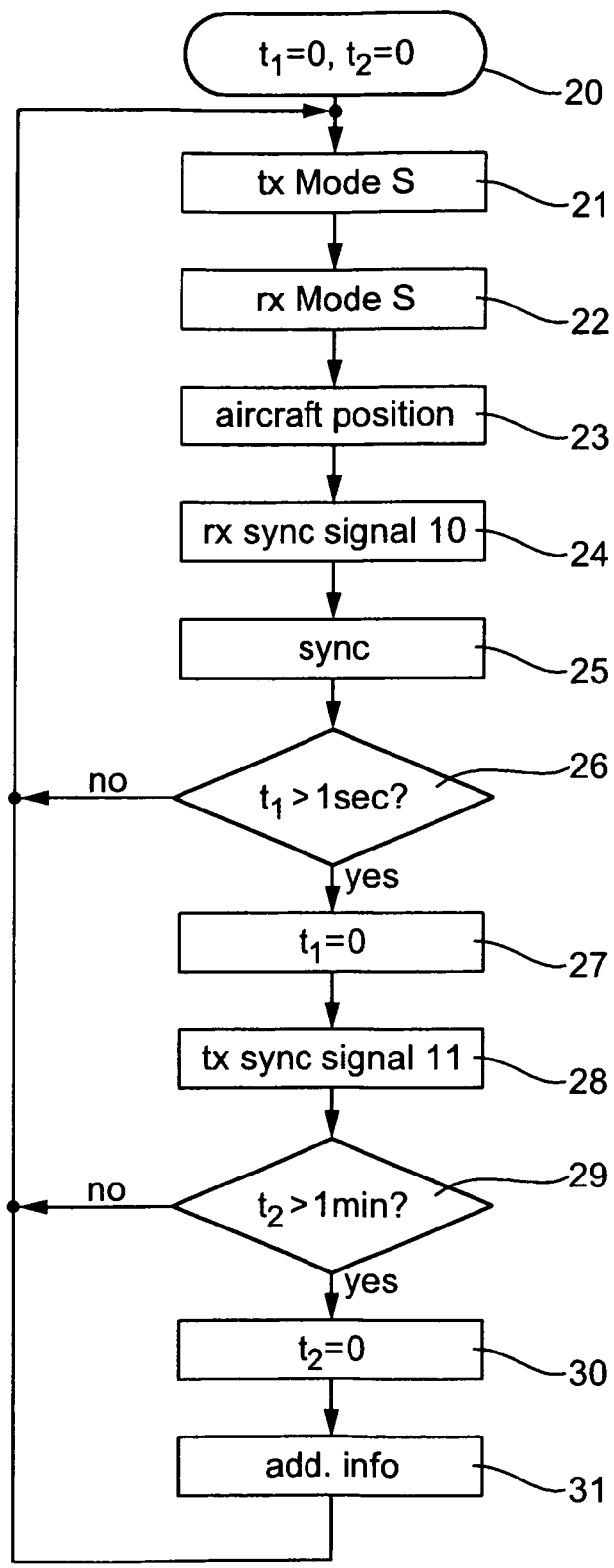
Figure 4:
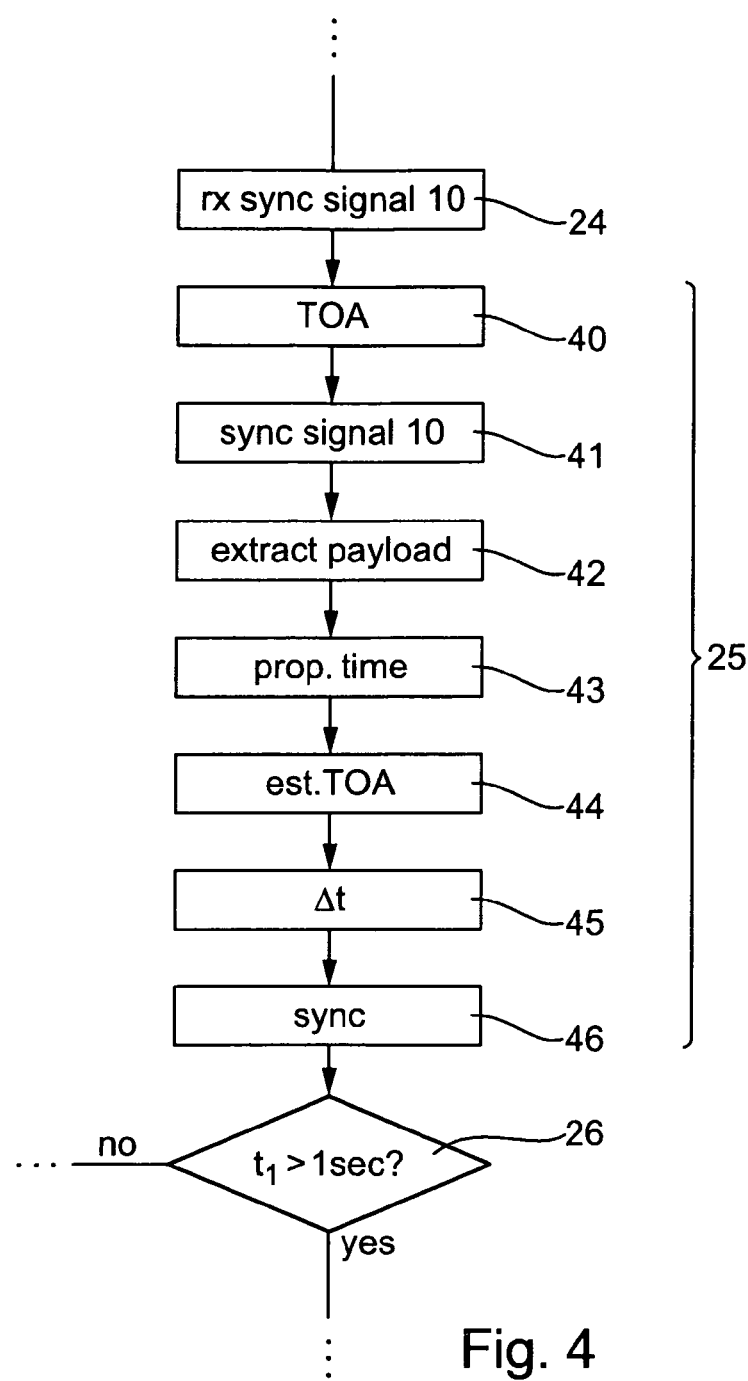

Preferred embodiments of the present invention are explained in detail hereinafter with reference to the accompanying drawings. These show:

FIG. 1 a first preferred embodiment of the SSR system according to the present invention;

FIG. 2 a second preferred embodiment of the SSR system according to the present invention;

FIG. 3 a preferred embodiment of the method for air traffic control by means of a SSR system according to the present invention; and FIG. 4 a preferred method for synchronizing secondary radar stations of the SSR system.

FIG. 1 shows a secondary surveillance radar (SSR) system 1 according to a first embodiment of the present invention. The SSR system 1 comprises a plurality of secondary radar stations 2, like the stations A, B, C, and D shown in FIG. 1. It is obvious to a person skilled in the art that the SSR system 1 can comprise more or less stations 2 than the four stations 2 shown in FIG. 1. Each of the stations 2 is provided with at least one antenna 3 for transmitting (sending) and receiving radio frequency (RF) signals. Data may be transmitted via the RF signals according to a Mode S standard defined by the ICAO (International Civil Aviation Organization). All stations 2 are connected to a central processing unit 4 via communication links 5. The links 5 may be cables or wireless links. The processing unit 4 comprises a control unit 6 and a visualization unit 7. Of course, the present invention is not limited to data signals according to the Mode S protocol, but can be realized with any kind of signals exchanged between ground stations and aircraft, for example UAT.

A transponder 9 on board of an aircraft (not shown) broadcasts response signals 8 in the Mode S standard (1090 MHz), which can be received by the antennas 3 of the stations A, B, C within the area of coverage of the transponder 9. From time to time at least some of the secondary radar stations 2 of the SSR system 1 transmit dedicated interrogation signals 8, 8' according to the Mode S standard (1030 MHz). The interrogation signals 8 transmitted by stations A, B, and C are received by the transponder 9 on board of the aircraft (not shown). The interrogation signals 8' transmitted by station D are not received by the transponder 9 for whatever reason. The transponder 9 or rather the processing logic behind the transponder 9 onboard the aircraft checks whether the received signal 8 contains a valid interrogation. If this is the case, the transponder 9 broadcasts a response signal 8 in the Mode S standard (1090 MHz), which can be received by the antennas 3 of the stations A, B, C within the area of coverage of the transponder 9. The response signals 8 contain, for example, an identification of the aircraft, an intended direction of the aircraft and further information regarding the health and status of the aircraft.

Timing information of the signals 8, in particular information indicative of the time of receipt (time of arrival) of the response signals 8 at the stations A, B, C, is transmitted to the central processing unit 4 via the communication links 5. The positions of the stations A, B, C is known in the central processing unit 4. The processing unit 4 determines the distance between the stations A, B, C on the one hand and the transponder 9 on the other hand by evaluating the time values provided to the processing unit 4 from the stations A, B, C. The position of the aircraft is determined in the processing unit 4 by means of a so-called multilateration process and the position may be displayed on the visualization unit 7, possibly together with further information regarding the aircraft.

Each of the secondary radar stations 2 has a local clock, for example in form of a crystal oscillator, providing a local time base or time domain. In order to allow a reliable and exact determination of the location of the aircraft the secondary radar stations 2 or rather their local clocks have to be synchronized. The present invention refers to an especially advantageous way for synchronizing the stations 2 onto a common time base valid for all stations 2. In order to simplify operations, this common time base may be UTC or some derivative thereof. However, the common time base may also be any other (including a synthetic) time base.

The synchronisation of the secondary radar stations 2 is performed by means of synchronisation information contained in the payload of synchronisation signals 10 (for example data packets) transmitted among the stations 2. In particular, the synchronisation information comprises timing information regarding the time of transmission of the sychronisation signals 10. The synchronisation data packets 10 are preferably transmitted as RF (radio frequency) signals according to the Mode S standard (or any other standard, for example UAT), too.

The main idea of the present invention is to provide for an easy, simple and cheap way for synchronising the secondary radar stations 2 of an SSR system 1. This is achieved by using hardware already present in the stations 2. Timing information is transmitted among the stations 2 via already existing signal transmission equipment. For the determination of the location of the aircraft by means of the Mode S multilateration process, the stations 2 are already equipped with hardware for receiving the time beacon signals 8 from the transponders 9 in the 1090 MHz-band and for sending interrogation signals 8 in the 1030 MHz-band. This hardware is used to send and receive the synchronisation signals 10 in the secondary radar stations 2. Hence, the stations 2 send the synchronisation signals 10 in the 1030 MHz-band (in that case the receiver in the stations 2 would have to be extended to the 1030 MHz-band), or preferably in the 1090 MHz-band (in that case the transmitter in the stations 2 would have to be extended to the 1030 MHz-band). Extension of the transmitters and/or receivers in the secondary radar stations 2 can be easily effected, because the necessary hardware is already present in the stations 2. Also, the necessary modulation method is already implemented in the stations 2.

Furthermore, the present invention does without additional external processing units to which the secondary radar stations 2 have to be connected for calculating the offsets of the various local clocks in respect to a common time base and for effecting the synchronisation of the stations 2. Rather, according to the present invention, the offsets of the local clocks are determined and the synchronisation of the stations 2 is performed in the stations themselves. This is achieved by transmitting timing information, in particular information indicative of the time of transmission of the synchronisation signals 10, as part of the synchronisation signals 10 among the stations 2. This gives each secondary radar station 2 receiving a synchronisation signal 10 the possibility to perform its own synchronisation. Hence, each secondary radar station 2 is able to synchronize itself by merely listening and receiving the synchronisation signals 10. The central processing unit 4 only serves for determining the location of the transponder 9 and the aircraft, respectively. It is not used for synchronizing the secondary radar stations 2.

The synchronisation process according to the present invention is very fast because no question-and-answer communication between the secondary radar stations 2 themselves and possible other external entities is necessary for performing the synchronisation of the stations 2. Merely one or more of the stations 2 has to transmit the sychronisation signal 10 already containing all information which the receiving stations 2 need in order to be able to perform their own synchronisation. In particular, the receiving stations 2 do not have to fetch additional information from other external entities or send a response to the sending station 2 before being able to perform the sychronisation.

In coherent systems the time of transmission of the synchronisation signal 10 can be easily and rather precisely predicted and transmitted in the synchronisation signal 10. However, in non-coherent systems this is not that easy. In that case the synchronisation signals 10 contain at least two consecutively transmitted data packets. The value for the time of transmission of a synchronisation signal 10 is part of the content of the second of the two consecutively transmitted data packets. The value of the time of transmission is predicted based on knowledge obtained from the transmission of the first of the two consecutively transmitted data packets. Of course, the sychronisation signal 10 comprising two consecutively transmitted data packets is not limited to non-coherent systems but can also be used in coherent systems.

Based on a possible application for the PAM-FRA (Precision Approach Monitoring Frankfurt air space) multilateration system the SSR system 1 can cover an area of about 150 per 100 nautical miles (corresponding to approximately 250 per 200 km). The synchronisation of the network comprising the secondary radar stations 2 is based on a backbone network and it is meshed. At least some of the stations 2 act as time beacon transmitters. In the example shown in FIG. 1 the stations A and C act as time beacon transmitters. Of course, it is possible that all stations 2 of the network act as time beacon transmitters. The stations 2 acting as time beacon transmitters are preferably located at exposed sites, for example on top of television or radio broadcast towers. The stations A and C acting as time beacon transmitters transmit periodically the synchronisation data packets 10, for example once or twice per second.

The information contained in the payload of the synchronisation signal 10 and used for synchronisation of the radar stations 2 comprises, for example, a point in time when the synchronisation signal 10 is sent from the transmitting secondary radar station A, C (so-called "time of transmission"). Of course, instead of the actual time of transmission some other variable or value indicative of the time of transmission could be used, too. The time of transmission is determined in the transmitting station's time domain. In order to facilitate the processing of the various times in the stations to be synchronized, the time values could all be provided in a standardized time, for example UTC (Universal Time Coordinated). The time of transmission cannot be measured in advance because the value for the time of transmission has to be inserted into the data payload before the signal 10 is actually transmitted, that is before the exact time of transmission is known. It would be possible to insert an estimate value of the time of transmission into the payload of the synchronisation signal 10.

However, according to a preferred embodiment, the synchronisation signal 10 consists of at least two consecutive data packets or telegrams. These two packets are associated to one another, for example, by way of an identical originating address or other corresponding identification, because both data packets have been transmitted by the same station 2. The two packets are transmitted immediately one after the other, that is the second packet is transmitted only milliseconds or even only microseconds after the transmission of the first packet has been accomplished. The transmission of the first packet may be utilized by the broadcasting station 2 for determining the transmission properties. The transmission properties determined in connection with the transmission of the first data packet (challenge) may be used for providing a very exact estimate of the time of transmission for the immediately following second data packet (follow-up). Alternatively, the second of the two data packets simply contains the actual time of transmission of the first packet.

The synchronisation signals 10 may also contain further information regarding the status, location and synchronisation of the transmitting station 2. In particular, the synchronisation signal 10 transmitted by a certain station 2 may contain the station's geographic location, information on which other station 2 the transmitting station is synchronized on, information on the quality of the synchronisation of the transmitting station 2 and other information regarding the health and status of the transmitting station 2. The other stations 2 act as clients and can receive the transmitted synchronisation signals 10. In the example shown in FIG. 1 the synchronisation signals 10 transmitted by station A are received by the other stations B and C. The other station D may be located out of reach of the transmitting station A and, therefore, cannot receive the synchronisation signals 10 transmitted by the station A. The receiving stations B and C can synchronize themselves by listening to the synchronisation signals 10 broadcast by the transmitting station A. The receiving stations B and C can correct their local clocks according to the synchronisation information contained in the payload of the received synchronisation information. By receiving additional synchronisation information from other secondary radar stations 2 acting as time beacons, a multi-meshed network for synchronisation purposes can be established.

Since in a network comprising stationary secondary radar stations 2 the geographic distance between transmitter and receiver of the synchronisation signal 10 is known, the propagation time of the synchronisation signal 10 can be determined at the receiving station. Additional information which may influence the propagation time apart from the distance between transmitter and receiver can be transmitted in the payload of the synchronisation signal 10, too. This additional information can be derived by two-way measurements, described in detail below with reference to the embodiment of FIG. 2. FIG. 1 refers to one-way measurements only. Receiving multiple time beacons improves the reliability and the accuracy of the synchronisation process. For example, in FIG. 1, station B receives synchronisation signals 10 from station A as well as from station C.

The synchronisation signals 10 transmitted by the secondary radar stations A and C apart from the time the synchronisation signals 10 are transmitted may comprise additional information. This can be but is not limited to two-way measurements to other time beacons, visibility of other beacons, effects present in the transmission path influencing the duration of the transmission of the synchronisation signals 10 to a certain station 2, differential GPS information and alerts. Efficient coding techniques ensure that this information might be transmitted despite the relatively low bit-rate available on the RF channel.

The additional information can also be transmitted by using different additional modulation techniques in the same (1090 MHz) channel or in other channels or by adding higher order modulation principles to the existing signal structure. This principle may be used for other signals (e.g. UAT) as well.

By using the above-described techniques for the synchronisation of the secondary radar stations 2 the SSR system 1 becomes freely scalable. It may easily be expanded by adding additional stations 2. They can be synchronized to the SSR system 1 very easily due to the fact that each secondary radar station 2 may synchronize itself automatically simply by receiving and processing the broadcast synchronisation signals 10 from one or more other stations 2 already synchronized. Adjacent WAM clusters do not need a specialized or proprietary protocol to synchronize their local time bases. Since every station 2 runs on a common time base, an arbitrary combination of all the SSR system's stations 2 may form a central processing station 2, many of which can co-exist.

An advantage of the present invention over the prior art WAM synchronisation architecture is that the timing mesh is freely scalable and inherently redundant, i.e. the loss of one time beacon transmitter (station 2) can be compensated by other stations 2. The present invention uses transmitter—transmitter links for the synchronisation backbone. The advantage is that these links can be established and evaluated with two-way calculation, monitoring also any effect on the transmission path (which is rebroadcast again). The two-way synchronisation is described in detail with reference to FIG. 2. In FIG. 2 those components already known from FIG. 1 and described with reference to FIG. 1 have the same reference signs than those of the embodiment according to FIG. 1.

The two-way synchronisation is explained on the basis of a secondary radar station 2 broadcasting a synchronisation signal 10, for example station A, which is received by another secondary radar station 2, for example station B. As mentioned above, the synchronisation signal 10 comprises a time of transmission or another value indicative of the time of transmission of the signal 10, that is the point in time when the signal 10 leaves the antenna 3 of station A, in its payload.

Further, station A also receives data signals 11 broadcast from one or more of the other stations B and C. By receiving the data signals 11 from other stations B and C, station A can find out which other stations B and C are within reach. For example, station D is disposed out of reach and, therefore, station A receives no data signals 11 from station D. Furthermore, station A can determine information regarding the transmission path between station A and the other stations B and C within reach. This information can, for example, be the quality of transmission. The information regarding the various transmission paths between station A and the other stations B and C can be input into a list or database at station A. The list can be updated from time to time. The content of the list is transmitted to the other stations B and C as additional information making part of the payload of the synchronisation signals 10. In order to reduce the required bandwidth necessary for the synchronisation of the stations 2 on the air interfaces between the stations 2, the additional information regarding the transmission path between station A and the other stations B and C is transmitted less often than the synchronisation information. For example, whereas the time of transmission used for the synchronisation of the stations 2 may be transmitted at least once or twice per second, it is sufficient if the additional information regarding the transmission path(s) is transmitted once a minute or even more rarely.

Together with information regarding the duration of the transmission of the synchronisation signal 10 from the transmitting station A to the receiving station B (so-called propagation time) the time of transmission extracted from the payload of the received synchronisation signal 10 at the receiving station B is used for determining an actual time of arrival at the receiving station B based on the sending station's A time base. This time of arrival based on the sending station's A time base is compared in the receiving station B with the actual time of arrival of the signal 10 at the receiving station B in the receiving station's B time base. By comparing these two times of arrival, a correction value for the station's B local clock can be calculated and station's B clock can be corrected by the correction value and synchronized with station's A local clock. Of course, it would also be possible to calculate an estimated time of transmission in the receiving station's B time domain from the actual time of arrival in station's B time domain and the synchronisation signal's 10 propagation time. In that case the actual time of transmission in the broadcasting station's A time domain is compared with the estimated time of transmission in the receiving station's B time domain in order to obtain the correction value for station's B local clock.

An element of uncertainty is the information regarding the duration of the transmission (propagation time) of the synchronisation signal 10 from the transmitting station A to the receiving station B if this information is calculated only on the basis of the distance between the two stations A and B. The distance to the other stations 2 may be stored in all secondary radar stations 2 of the SSR system 1. However, this is possible only in stationary stations 2. Further, this implies that the structure of the SSR system 1, in particular the number and identification of all stations 2, is known and stored in all stations 2 beforehand. This significantly reduces flexibility of the system 1 because adding new stations 2 can be rather complicated. Furthermore, each station 2 has to have appropriate storage means for storing the network information.

If the stations 2 are mobile it is advantageous if the stations 2 are provided with means for determining their positions, for example, GPS or other similar satellite receivers. The exact information on the stations' 2 actual location determined by GPS or similar systems may be transmitted from the sending station A to the receiving station B as part of the synchronisation signals' 10 payload. With this information and knowing their own position, the receiving stations B can calculate quite exact values for the distance between the broadcasting station A and the receiving station B and further for the duration of the transmission of the synchronisation signal 10 from the transmitting station A to the receiving station B even if the stations A, B are mobile stations 2.

The accuracy of the value for the duration of the transmission of the synchronisation signal 10 can be further enhanced if the quality of the transmission between the SSR system's 1 stations 2 is determined. This can be achieved by means of the data signals 11 received by the station A broadcasting the synchronizing signals 10 from other stations 2, for example stations B and C. A value indicative of the quality of transmission may be, for example, the actual duration of transmission of the further data signals 11 from the transmitting stations B and C to the receiving station A. The further signal 11 may be a synchronisation signal, carrying synchronisation information in its payload, similar to the synchronisation signal 10. By evaluating the time properties of the transmitted signal 11 in the receiving station A, a highly precise realistic value for the duration of signal transmission between stations A and B can be determined. This information can then be inserted into the payload of the synchronisation signal 10 and transmitted from station A to the station B, where it is used among other time values and information to calculate the correction value for the local clock. The transmission of signals 10, 11 in both directions between stations 2 is part of the two-way synchronisation shown in FIG. 2.

Although in the present patent application data transmission from one station to another is mentioned, it is made clear that this is not a point-to-point data transmission. Rather, the transmitted signals are broadcast signals which are transmitted by a certain station 2, for example station A, and can be received by any of the other stations 2, for example stations B, C, or D, within the area of coverage of station A. The same applies to the return signals 11, which are broadcast signals, too. Nonetheless, the broadcast signals 10 and/or 11 may contain receiving address information which assigns a certain signal 10, 11 to a certain receiving station 2. For example, the synchronisation signal 10 broadcast by station C is received by stations B and D (which in the event are synchronized on station C). If the return signal 11 contained synchronisation information, too, it could be considered a synchronisation signal. In that case the return signal 11 transmitted by station C would correspond to the synchronisation signal 10 broadcast by station C, and synchronisation signal 10 (as return signal 11) would be received by station A (which in the event is also synchronized on station C).

FIG. 3 shows a preferred embodiment of the method for air traffic control by means of an SSR system 1 according to the present invention. The method according to FIG. 3 runs on one of the SSR system's 1 secondary radar stations 2. The method begins in functional block 20, where timers $t_1$ and $t_2$ are set to zero. In the following functional block 21 a Mode S interrogation signal 8 or any other type of appropriate broadcast signal is broadcast by the station 2. This signal 8 may be received by the transponder 9 of an aircraft, which transmits a corresponding Mode S or any other type of appropriate response signal 8. The signal 8 transmitted by the transponder 9 is received by the secondary radar station 2 in functional block 22. In functional block 23 the received signal 8 is processed or at least information regarding the location and the altitude of the aircraft possibly together with information regarding the signal's 8 time properties is determined in the station 2 and forwarded to the SSR system's 1 central processing unit 4 via the communication links 5. In the processing unit 4 the aircraft's location is calculated (control unit 6) and visualized together with further information regarding the aircraft (visualization unit 7).

Then in functional block 24 the station 2 receives at least one synchronisation signal 10 broadcast from one or more other stations 2. In functional block 25 the station's 2 local clock is synchronized depending on the content, in particular the time of transmission, of the one or more received synchronisation signals 10. A synchronisation signal 10 is transmitted approximately once each second by each of the stations 2 of the SSR system 1. If the received synchronisation signal 10 comprises additional information regarding the transmission path from the transmitting station 2 to the receiving station 2 where the method is running, the additional information is extracted from the signal's 10 payload and processed in order to determine more accurately the propagation time the signal 10 needs for travelling from the broadcasting station 2 to the receiving station 2. Additional information regarding other transmission paths from the transmitting station 2 to other stations 2, which are not the station 2 on which the present method is running, is discarded. However, similar methods to the one described here may be running on those stations, too. Each station 2 inserts additional information regarding the transmission path into the payload of the synchronisation signal 10 it transmits approximately each minute, that is approximately each $60^{th}$ synchronisation signal 10 comprises the additional information regarding the quality of the transmission between the transmitting and the receiving station 2.

In an interrogation block 26 it is determined whether the time t has exceeded a certain time value, for example one second. If not, the station 2 continues to transmit Mode S or similar interrogation signals and to receive Mode S or similar response signals from aircraft transponders 9 (blocks 21 to 23) and to receive synchronisation signals 10 from other stations 2 and to synchronize its local clock (blocks 24 and 25) until the time has exceeded one second.

If the time t has exceeded one second, in functional block 27 the timer $t_1$ is set to zero again. In functional block 28 the station 2 broadcasts its own signal 11, which may be received by other stations 2 within reach and which may contain information for synchronizing the other stations 2. Hence, in this embodiment synchronisation information, in particular the time of transmission of the signal 11, is broadcast by the station 2 each second.

In an interrogation block 29 it is determined whether the time $t_2$ has exceeded a certain time value, for example one minute. If not, the method returns to functional block 21 until the timer $t_2$ has exceeded one minute. If timer $t_2$ has exceeded one minute, in functional block 30 the timer $t_2$ is set to zero again. Then, in functional block 31 station 2 provides additional information regarding the quality of transmission to one or more of the other stations 2 to be inserted into the synchronisation signal 11 broadcast by the station 2 and received by other stations 2 within reach during step 28 the next time the methods runs that step.

Then, the method returns to step 21 where Mode S or similar interrogation signals 8 are transmitted again until after one further second the station 2 transmits synchronisation signals 11 comprising the time of transmission again and after one further minute the station broadcasts synchronisation signals 11 again with additional information referring to the transmission path between the station 2 and one or more of the other stations 2.

The synchronisation signals 10 received by the station 2 as well as the synchronisation signals 11 broadcast by the station 2 are received or transmitted, respectively, via an air interface of the station 2. The station 2 is provided with this air interface anyway in order to transmit and receive the Mode S or similar broadcast signals 8 to or from the aircraft. The same hardware present in the stations 2 is used for the synchronisation of the stations 2 of the SSR system 1. Hence, the synchronisation messages are transmitted according to a Mode S, a UAT or a similar standard.

In the following, step 25 of synchronizing the receiving station's 2 local clock on the transmitting station's clock is explained in more detail with reference to FIG. 4. The synchronisation of station 2 starts in functional block 24 with the receipt of S Mode or similar data packets broadcast by one of the other SSR system's 1 stations 2. In functional block 40 the time of arrival of data packets is determined based on the receiving station's 2 (unsynchronised) local clock's time base.

Then in functional block 41 the received data packets are identified as part of the synchronisation signal 10. For identification purposes the data packets making part of the synchronisation signal 10 could comprise a certain identifier. Alternatively, the data packets could be identified as making part of the synchronisation signal 10 simply by their content. Receiving station 2 could determine that the data packets contain synchronisation information, like the signals' 10 time of transmission, in their payload.

Then, in the following functional block 42 the payload information to be used for the synchronisation of station 2 is extracted from the received data packets. As already indicated above, this information could comprise but is not limited to:

- an identification of the station 2, which transmitted the synchronisation signal 10,
- point in time when the synchronisation signal 10 has been transmitted by the transmitting station 2 (time of transmission),
- information on the transmission path between the transmitting station 2 and the receiving station 2,
- location (e.g. GPS data) of the transmitting station 2,
- information on which of the SSR system's 1 other stations 2 the transmitting station 2 is synchronized, and
- information on the quality of the synchronisation of the transmitting station 2.

In functional block 43 the duration of time, which the transmission of the received synchronisation signal 10 from the transmitting station 2 to the receiving station 2 took, (so-called propagation time) is determined. The duration of time can be determined in many different ways. For example, it could be extracted directly from the payload of the received data packets, if it was transmitted as part of the additional information in the payload of the synchronisation signal 10. If the location of the transmitting station 2 was transmitted as part of the additional information in the payload of the synchronisation signal 10, the distance between the transmitting and the receiving station 2 and in the event the propagation time could be determined. If the distance between the transmitting and the receiving station 2 was transmitted as part of the additional information in the payload of the synchronisation signal 10, it could be extracted from the payload and in the event the propagation time could be determined. Finally, an identification of the transmitting station 2 could be extracted from the received signal 10 and used for reading out the propagation time form a database, in which all the propagation times between all the SSR system's 1 stations 2 are stored. The information on the quality of the transmission path between the transmitting station 2 and the receiving station 2 could be used for enhancing the accuracy of the determination of the propagation time Thereafter, in functional block 44, the time of arrival of the received signal 10 is calculated by adding the time of transmission (this information is transmitted in the payload of the received signal 10 and extracted in step 42) to the propagation time determined in step 43. The time of arrival calculated in step 44 is based on the transmitting station's (synchronized) time base.

In functional block 45 a correction value for the receiving station's 2 local clock's (unsynchronised) time base is calculated. This calculation can be effected by comparing the actual time of arrival determined in step 40 (based on the receiving station's 2 (unsynchronised) time base) with the predicted time of arrival calculated in step 44 (based on the transmitting station's (synchronized) time base). The difference between these two times of arrival may be used as the correction value.

Finally, in functional block 46, the receiving station's 2 local clock is synchronized to the transmitting station's 2 local clock by adding the correction value calculated in step 45 to the local time base of the receiving station's 2 local clock. From now on, the receiving station 2 is synchronized to the transmitting station 2 and can, on his part, transmit synchronisation signals 10 for synchronizing other stations 2. For example, in the embodiments shown in FIG. 1 and FIG. 2 station C is synchronized on station A. Then station C may transmit synchronisation signals 10 which are used for the synchronisation of station D. In that way station D can be synchronized to station's A time base (via station C) even though station D is not within the area of coverage of station A. This allows the mesh of stations 2 to synchronize all the SSR system's 1 stations 2 extended to a very large area without having to establish clusters with different time bases.

According to a further embodiment of the present invention shown in FIG. 5, the transponder 9 of a mobile or airborne user receives the synchronisation signals 10 from transmitting secondary radar stations, like the radar stations A, C. The mobile or airborne user is provided with processing means for determining the current geographical position of the user from the information indicative of the time of transmission of the synchronisation signals 10 extracted from the received signals 10. If the transponder 9 receives synchronisation signals 10 from four or more secondary radar stations, the processing means can precisely calculate the user's location two- as well as three-dimensionally. However, if the transponder 9 receives less than four signals 10, apart from the received synchronisation signals 10 and the timing information contained therein additional information from other position determination means, in particular Distance Measurement Equipment (DME), can be used for determining the current geographical position of the mobile or airborne user in order to provide full functionality of a 2D/3D navigation system completely independent from conventional navigation systems, like GPS or the like. In that case the airborne user's processing means process the timing information contained in the time signals broadcast by the time beacon transmitters A, C as well as additional information from other position determination means, for example a DME. The processing means preferably comprise one or more processors, on which a computer program in executed in order to perform the localisation of the airborne user based on the timing information from signals 10 and, possibly, on additional information from a DME. According to this embodiment one and the same signal, the synchronisation signal 10, is used for the synchronisation of the secondary radar stations 2 of the SSR system 1 as well as—at least locally within reach of the synchronisation signals 10—for the localisation of airborne vehicles. This has particular advantages in particular near airports, where the amount of RF signals necessary for the synchronisation of the secondary radar stations 2 and for the localisation of the aircraft can be significantly reduced.

For the sake of a better understanding, in FIG. 5 the Mode S interrogation signals 8 have not been shown, although at least temporarily present in the embodiment of FIG. 5, too.

The invention claimed is:

1. A secondary surveillance radar (SSR) system comprising;
 a plurality of secondary radar stations each equipped with a radio frequency (RF) transmitter and receiver sending RF signals to and receiving RF signals from a transponder in an aircraft, each of the secondary radar stations operating on a local time base requiring synchronisation with the time bases of others of the secondary radar stations;
 characterized in that the same transmitters and receivers in each of the secondary radar stations sending and receiving to and from the transponder in an aircraft, also send and receive RF synchronisation signals directly to and receive RF synchronisation signals directly from individual ones of the other secondary radar stations only at 1090 MHz frequency band, the synchronisation signals implemented in a data packet protocol with data sufficient for synchronisation at each secondary radar station, the data including at least a value for a time of transmission of the synchronisation signals.

2. The secondary surveillance radar system according to claim 1, wherein the secondary radar stations measure the difference of their time bases by means of two-way-measurements by exchanging the synchronisation signals.

3. The secondary surveillance radar system according to claim 1, characterized in that the synchronisation signals are broadcast across air interfaces also used for communication with the transponder in the aircraft to be tracked.

4. The secondary surveillance radar system according to claim 1, characterized in that the synchronisation signals are broadcast using a same time standard used for communication with the aircraft to be tracked.

5. The secondary surveillance radar system according to claim 4, characterized in that the synchronisation signals are broadcast according to a Mode S, a UAT, or a VDL standard.

6. The secondary surveillance radar system according to claim 1, wherein the content of the synchronisation signals comprises additional information regarding the transmission path between the receiving secondary radar station and the secondary radar station broadcasting the synchronisation signals, in particular information which affects the propagation time across the transmission path.

7. The secondary surveillance radar system according to claim 6, wherein the additional information regarding the transmission path comprises information regarding quality of the received signals.

8. The secondary surveillance radar system according to claim 6, wherein the additional information regarding the transmission path is determined at the secondary radar station broadcasting the synchronisation signals by data signals received and broadcast by the secondary radar station receiving the synchronisation signal.

9. The secondary surveillance radar system according to claim 6, characterized in that the additional information regarding the transmission path is transmitted at a lower rate than the information regarding the time of transmission of the synchronisation signals.

10. The secondary surveillance radar system according to claim 1, wherein information regarding location of the broadcasting secondary radar station is part of content of the transmitted synchronisation signals.

11. The secondary surveillance radar system according to claim 1, wherein at least one of the system's secondary radar stations, in particular a secondary radar station to be synchronized, is provided with a power supply comprising a battery rechargeable by means of a solar panel.

12. The secondary surveillance radar system according to claim 1 wherein the secondary radar stations are adapted for broadcasting interrogation data signals and for receiving return data signals comprising information regarding the aircraft to be tracked and emitted from the transponder in response to a received interrogation data signal received by the transponder, the return data signals received by the secondary radar stations being forwarded to a central processing unit determining a position of the aircraft, wherein the information regarding the aircraft received from the air transponder is forwarded to the central processing unit over a same wireless interface used for the synchronisation signals.

13. The secondary surveillance radar system according to claim 1 wherein the synchronisation signals are received by the transponders for determining current geographical position.

14. The secondary surveillance radar system according to claim 13 wherein Distance Measurement Equipment is used for determining current geographical position of the aircraft to be tracked.

15. A secondary surveillance radar station comprising:
 RF transmitting and receiving equipment enabled to receive RF signals from a transponder in an aircraft and to directly transmit to and from individual ones of others of a plurality of secondary radar stations only at 1090 MHz frequency band;
 wherein the secondary radar stations each work on a local time base synchronized depending on content of synchronisation signals received from individual ones of the other secondary radar stations via the same RF transmitting and receiving equipment used to communicate with the transponder in the aircraft, and wherein the synchronisation signals between the secondary radar stations each provide to the receiving radar station a value for the time of transmission of the synchronisation signal.

* * * * *